J. M. BURDICK & E. A. SCHADE.
LEVEL.
APPLICATION FILED MAR. 11, 1912.

1,050,610.

Patented Jan. 14, 1913.

J. M. Burdick, Inventors
E. A. Schade
By their Attorneys

UNITED STATES PATENT OFFICE.

JAMES M. BURDICK AND EDMUND A. SCHADE, OF NEW BRITAIN, CONNECTICUT, ASSIGNORS TO STANLEY RULE & LEVEL COMPANY, OF NEW BRITAIN, CONNECTICUT, A CORPORATION OF CONNECTICUT.

LEVEL.

1,050,610.  Specification of Letters Patent.  Patented Jan. 14, 1913.

Application filed March 11, 1912. Serial No. 683,031.

*To all whom it may concern:*

Be it known that we, JAMES M. BURDICK and EDMUND A. SCHADE, citizens of the United States, residing at New Britain, county of Hartford, State of Connecticut, have invented certain new and useful Improvements in Levels, of which the following is a full, clear, and exact description.

Our invention relates to levels and adjusting means therefor, and is particularly directed to a level provided with supporting means which will act to cushion sudden shocks and jars and thereby prevent the breaking of the level glass. These and other advantages will more fully appear from the following specification and from the accompanying drawings forming part thereof, in which—

Figure 1:
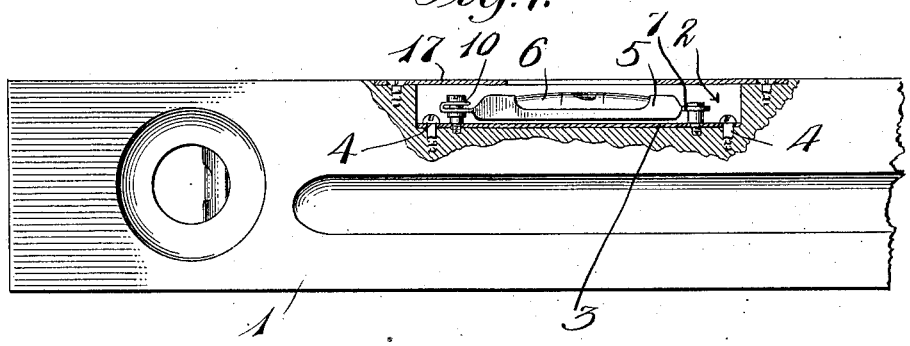
Figure 2:
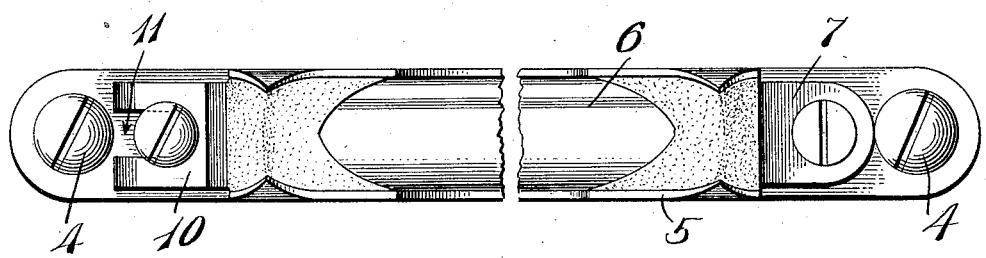
Figure 3:
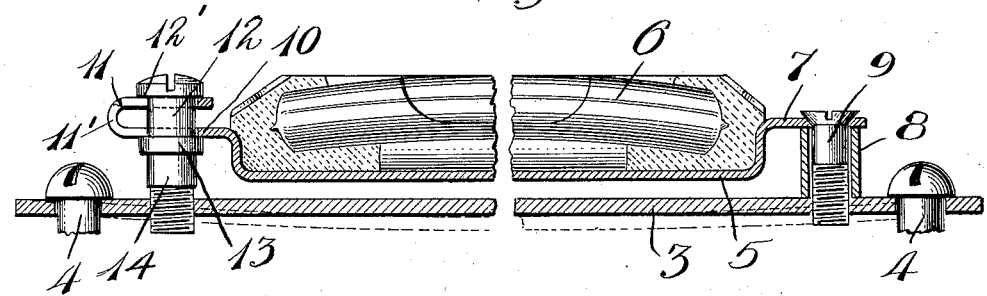
Figure 6:
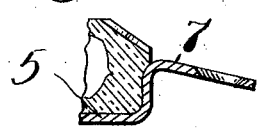
Figure 4:
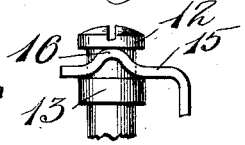
Figure 5:
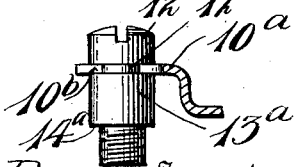

Figure 1 is a view in elevation of a level beam, a part of the beam being shown in section to disclose the level mounted therein. Fig. 2 is a top plan view of the assembled level and its supporting attachments. Fig. 3 is a longitudinal vertical section of the level as shown in Fig. 2. Fig. 4 is a fragmentary detail view of a modification of the resilient supporting means. Fig. 5 is a further modification of such connection. Fig. 6 is a partial sectional view illustrating the form of tensioning flange before assembling.

Referring to the drawings by numerals: 1 indicates a fragment of a level beam recessed at 2 to receive the level itself. This level is mounted upon the base plate 3 secured to the bottom of the recess 2 by means of the screws 4 shown. A level glass case or carrier 5, preferably of sheet metal, and carrying a level glass 6 of the usual construction, is supported above the base plate 3 and adjusted relative thereto by the following means. At one end the case 5 is provided with a tensioning flange or extension 7 apertured to receive a screw 9 provided with a countersunk head and resting upon the top of a sleeve 8, which incloses the shank of said screw and itself rests upon the base plate 3. Preferably the screw 9 is of sufficient length to engage with a threaded aperture in the base plate and extend therethrough into the material of the level beam. At its other end, the case or carrier 5 is extended at 10 to form a U-shaped support provided with a slot 11 intermediate its sides and extending to a point adjacent the end of the extension. A screw 12 adapted for engagement with a threaded aperture in the base plate 3, is inserted in said base plate and preferably screwed down to engage with the material of the level beam. This screw is provided with a shoulder 13 spaced from the flanged head 12'. The U-shaped extension 10 of the case or carrier 5 is adapted to be inserted under the head of the screw and with its upper and lower edges frictionally gripping the flanged head of said screw and bearing against the shoulder 13 thereof respectively. This extension 10 and the tensioning flange 7 are formed of spring material, and act as a cushioning support for the case or carrier 5 in the manner hereinafter described. The material forming this case is preferably sheet metal of the same material as the extension 10 and flange 7, but it is obvious that said case may be of different material from the end supports therefor, and that the latter may be secured thereto and not integral therewith. The construction of this case from sheet material with the extensions 7 and 10 integral therewith, however, is preferable. The case may be raised or lowered to give the level the proper adjustment by operating the screw 12 to raise or lower the same.

In Fig. 4 we have shown a modified form of end support. In this form, 15 indicates the extended end of the case 5, which is likewise slotted and is provided with the bend 16 taking against the flanged head of screw 12.

In assembling the level within the level beam, the base plate 3 is preferably bent, as indicated in dotted lines in Fig. 3, so that when assembled, a tension against the heads of the screws 4 is insured. The tensioning flange 7, before the level is mounted upon its supports, is formed with a downward bend, as shown in Fig. 6, so that when it is mounted upon the sleeve 8 and the U-shaped extension 10 at the other end of the case is inserted under the head of screw 12, as before described, a downward tension is exerted on the extension 10, and through it to the threads of the screw support 12, thereby preventing said screw from turning, through jar or other cause, to disturb the adjustment of the level. This tensioning bend of the flange 7 will also impart upward tension against the countersunk head of screw 9, thereby preventing it from turning through jar, etc., to disturb the adjustment of the level.

The U-shaped extension 10 and its modified form 16, act as supplemental cushioning springs, and while we find their use preferable and desirable in connection with the tension flange 7, they can be dispensed with if necessary and a straight flange 10ᵃ (Fig. 5) substituted, having its end slotted at 10ᵇ and having a tight engagement with abutments 12ᵃ and 13ᵃ on the screw support 12. By reason of the tensioning of the flange 7, this end 10ᵃ of the case bears against its screw support with a resilient tension, and not only prevents the adjustment of the level from being disturbed by jar or other cause, but also forms a cushion to such jar to thereby prevent the level glass being broken. In the form just described, a bottom shoulder 14ᵃ is preferably provided on the screw 12 to prevent said screw from being moved downwardly too far.

In order to prevent the screw 12 from being moved downwardly too far to thereby distort the bend 11' of the spring tension 10, this screw 12 is provided adjacent its lower end with a shoulder 14, which will engage with the base plate 3 and prevent downward movement of said screw beyond the danger point.

When the device thus described is assembled within the recess 2 of the level beam, a cover plate 17 is secured to the face of the beam flush therewith, and is provided with a suitable aperture through which the level 6 may be viewed.

While we have described a specific embodiment of our device, it is susceptible of numerous modifications and adaptations within the spirit of the invention and of the appended claims.

What we claim is:

1. A level construction comprising a beam having a recess therein, a level glass case and level glass within said recess, case end supports carried by said beam within said recess, said case being provided with a tensioned end extension of resilient material engaging an end support.

2. A level construction comprising a beam having a recess therein, a level glass case and level glass within said recess, case end supports carried by said beam within said recess, one of said supports being adjustable and said case being provided with a tensioned end extension of resilient material engaging with said adjustable support.

3. A level construction comprising a beam having a recess therein, a level glass case and level glass within said recess, a stationary support carried by said beam within said recess for one end of said case and a second and adjustable support within said recess for the other end of said case, said case being provided with a tensioned end of resilient material engaging the adjustable support.

4. A level construction comprising a beam having a recess therein, a level glass case of sheet metal within said recess, a level glass carried by said case, case end supporting members carried by said beam within said recess, one of said members being adjustable, said case having integral end extensions engaging said supporting members, one of said end extensions being formed as a tensioned resilient member engaging said adjustable supporting member.

5. A level construction comprising a beam having a recess therein, a level glass case of sheet metal within said recess, a level glass carried by said case, a stationary support carried by said beam within said recess for one end of said case, an adjustable support within said recess for the other end of said case provided with spaced abutments thereon, an integral extension at one end of said case engaging said stationary support, and a slotted integral extension at the other end of said case formed as a tensioned resilient member engaging with said adjustable support between the abutments thereof.

6. A level construction comprising a beam having a recess therein, a base plate secured to said beam at the bottom of said recess, a level glass case of sheet metal within said recess, a level glass carried by said case, an integral tensioning flange extending from one end of said case, a stationary support therefor secured to said base plate, a screw support for the other end of said case engaging said base plate and provided with spaced abutments thereon, and a slotted extension at the other end of said case, having a bend therein adapted to engage said screw support between its abutments and be resiliently tensioned thereagainst.

7. A level construction comprising a beam having a recess therein, a base plate secured to said beam at the bottom of said recess, a level glass case of sheet metal within said recess, a level glass carried by said case, an integral tensioning flange extending from one end of said case, a stationary support therefor secured to said base plate, a screw support for the other end of said case engaging said base plate and provided with spaced abutments thereon, a slotted extension at the other end of said case having a U-shaped bend therein adapted to be seated upon said screw support between the abutments thereon and adapted to be resiliently tensioned thereagainst, and means carried by said screw support adapted to limit its adjustment toward said base plate.

8. A level construction comprising a beam having a recess therein, a sheet metal level glass case within said recess and a level glass with said case, integral end extensions carried by said case, a stationary support for one end extension of said case, a screw for clamping said extension upon said stationary support, an adjustable screw support for the other end extension of said case, said extension being formed as a tensioned resilient member engaging its adjustable screw support and tensioning both screws against adjustment destroying movement.

JAMES M. BURDICK.
EDMUND A. SCHADE.

Witnesses:
E. D. CASE,
W. J. WORAM.